United States Patent
Meschenmoser et al.

(10) Patent No.: US 11,422,388 B2
(45) Date of Patent: Aug. 23, 2022

(54) METHOD FOR PRODUCING A SEMI-FINISHED SPECTACLE LENS AND SEMI-FINISHED SPECTACLE LENS

(71) Applicant: Carl Zeiss Vision International GmbH, Aalen (DE)

(72) Inventors: Ralf Meschenmoser, Essingen (DE); Dennis Klora, Stuttgart (DE); Marc Ellenrieder, Aalen (DE)

(73) Assignee: Carl Zeiss Vision International GmbH, Aalen (DE)

(*) Notice: Subject to any disclaimer, the term of this patent is extended or adjusted under 35 U.S.C. 154(b) by 0 days.

(21) Appl. No.: 16/993,156

(22) Filed: Aug. 13, 2020

(65) Prior Publication Data
US 2020/0371380 A1 Nov. 26, 2020

Related U.S. Application Data

(63) Continuation of application No. PCT/EP2019/053692, filed on Feb. 14, 2019.

(30) Foreign Application Priority Data

Feb. 14, 2018 (EP) .................................... 18156641

(51) Int. Cl.
*G02C 7/02* (2006.01)
*B29D 11/00* (2006.01)

(52) U.S. Cl.
CPC ........ *G02C 7/021* (2013.01); *B29D 11/00317* (2013.01); *B29D 11/00432* (2013.01); *G02C 7/024* (2013.01)

(58) Field of Classification Search
CPC ........ G02C 7/021; G02C 7/022; G02C 7/024; B29D 11/00317; G09F 3/0297; G09F 3/10; G09F 2003/0232; G09F 2003/0235
See application file for complete search history.

(56) References Cited

U.S. PATENT DOCUMENTS 5,219,497 A * 6/1993 Blum .................... B29C 35/04
264/1.38
5,343,657 A 9/1994 Ohlin
(Continued)

FOREIGN PATENT DOCUMENTS

CN 104838307 A 8/2015
DE 202012011619 U1 4/2013
(Continued)

OTHER PUBLICATIONS

"Ophthalmic optics—Spectacle lenses—Vocabulary (ISO 13666:2012)," German and English version EN ISO 13666:2012, Oct. 2013.
(Continued)

*Primary Examiner* — Jordan M Schwartz
(74) *Attorney, Agent, or Firm* — Tautz & Schuhmacher LLC; Georg M. Hasselmann

(57) ABSTRACT

A method for producing a semi-finished spectacle lens and a semi-finished spectacle lens includes identifying the semi-finished spectacle lens by applying a removable sticker having a unique code to the semi-finished spectacle lens. The semi-finished spectacle lens has an embossed code that is engraved into the semi-finished spectacle lens. The sticker is applied to at least partially cover the embossed code. The sticker can be applied directly onto the semi-finished spectacle lens early in the manufacturing process, for example immediately after molding or injection molding. The sticker can also be applied to the semi-finished spectacle lens before further surface treatment is carried out.

11 Claims, 9 Drawing Sheets

(56) References Cited

U.S. PATENT DOCUMENTS

| | | | |
|---|---|---|---|
| 9,274,350 B2 | 3/2016 | Ochrombel et al. | |
| 2003/0022610 A1* | 1/2003 | Simke | C03B 33/08 |
| | | | 351/159.75 |
| 2005/0046792 A1* | 3/2005 | Ito | G02C 7/021 |
| | | | 351/159.75 |
| 2006/0001828 A1* | 1/2006 | Duggan | G02C 7/021 |
| | | | 351/159.69 |
| 2008/0026679 A1 | 1/2008 | Siders et al. | |
| 2008/0286458 A1 | 11/2008 | Kirchoff | |
| 2010/0258618 A1* | 10/2010 | Philbrick | G06K 19/06 |
| | | | 235/375 |
| 2011/0007269 A1* | 1/2011 | Trumm | G02C 13/005 |
| | | | 351/204 |
| 2011/0101552 A1 | 5/2011 | Cocora et al. | |
| 2012/0244306 A1 | 9/2012 | Hosoda et al. | |
| 2012/0314186 A1 | 12/2012 | Levraud et al. | |
| 2013/0075465 A1 | 3/2013 | Schneider | |
| 2016/0321959 A1 | 11/2016 | Constantinou | |
| 2017/0299886 A1* | 10/2017 | Carmon | G02C 7/021 |
| 2019/0187487 A1* | 6/2019 | Abe | B24B 13/0055 |
| 2020/0041815 A1* | 2/2020 | Gromotka | G01M 11/0278 |
| 2020/0262163 A1* | 8/2020 | Henry | B65D 81/05 |

FOREIGN PATENT DOCUMENTS

| | | |
|---|---|---|
| EP | 318164 A2 | 5/1989 |
| EP | 2541490 A1 | 1/2013 |
| WO | 2007001251 A1 | 1/2007 |
| WO | 2013092987 A1 | 6/2013 |

OTHER PUBLICATIONS

Extended European Search Report of European priority application EP 18 156 641.5, to which this application claims priority, dated Oct. 5, 2018, and English-language translation thereof.

International Search Report of the International Searching Authority issued in PCT/EP2019/053692, to which this application claims priority, dated Aug. 7, 2019, and English-language translation thereof.

International Preliminary Examination Report of the International Searching Authority issued in PCT/EP2019/053692, to which this application claims priority, dated Jun. 2, 2020, and English-language translation thereof.

Office action by the Chinese Patent Office issued in CN 201980018981.3, which is a counterpart hereof, dated Oct. 29, 2021, and English-language machine translation thereof.

* cited by examiner

Related Art

METHOD FOR PRODUCING A SEMI-FINISHED SPECTACLE LENS AND SEMI-FINISHED SPECTACLE LENS

CROSS REFERENCE TO RELATED APPLICATIONS

This application is a continuation application of international patent application PCT/EP2019/053692, filed Feb. 14, 2019, designating the United States and claiming priority from European patent application 18 156 641.5, filed Feb. 14, 2018, and the entire content of both applications is incorporated herein by reference.

TECHNICAL FIELD

The present disclosure relates to a method for producing a semi-finished spectacle lens, in particular for identifying and tracking a semi-finished spectacle lens in manufacturing. The disclosure furthermore relates to the use of a sticker for identifying a semi-finished spectacle lens in manufacturing, to a semi-finished spectacle lens and to an apparatus for processing a semi-finished spectacle lens.

BACKGROUND

WO 2013/092987 A1 discloses a method for storing information on a spectacle lens or semi-finished spectacle lens, wherein a marking is produced permanently on or in the glass or plastic body forming the spectacle lens or semi-finished spectacle lens. The marking is produced by a marking system permanently on or in the glass or plastic body at a definition point of a local body-specific glass or plastic body coordinate system defined by two points on or in the glass or plastic body. In said local glass or plastic body coordinate system, the manufacturer specifies the location of the lens horizontal and/or of the distance and/or near and/or prism reference point. A reference is thus provided after the surface processing.

EP 2 541 490 A1 is concerned with the authentication of lenses and further discloses a lens processing management system, in which an authentication section for lenses is provided in order to prevent an unauthorized use of a lens design. US 2013/0075465 A1 discloses a method in which firstly an activation code is detected and subsequent steps are carried out only after a permissible activation code has been detected. Unauthorized production can thus be prevented.

The document US 2012/0314186 A1 describes a method for edge processing of a spectacle lens. The manufacturer produces a unedged spectacle lens and provides it with a memory marking. The information stored in the memory marking is read out by the optician and the edge processing of the spectacle lens is performed on the basis of the stored information.

Various methods for the mass production of spectacle lenses, semi-finished spectacle lenses or so-called pucks, semi-finished products or blanks are known. Two customary production methods are casting and injection molding.

In "casting," the thermosetting plastic allyl diglycol carbonate (e.g., CR39) is usually used in spectacle optics. The monomer is typically present in the form of a liquid of low viscosity. In order to obtain a spatially crosslinked solid, a peroxide catalyst is supplied. The casting formulation is then introduced into a tool mold or casting mold having e.g., two (glass) mold shells. An elastic spacer ring is situated between said mold shells. The polymerization takes place for example in the refrigerator/heating cabinet or in the water bath at temperatures of between 50 and 100° C. Since the temperature is intended to be increased very slowly and uniformly, the duration of the polymerization process can be as much as several hours to days depending on the thickness and geometry of the casting. The outstanding mechanical loading capacity of this plastic allows the casting not only of finished products but also of semi-finished products, for example with a first surface (e.g., front surface) already shaped, the second surface (prescription surface; e.g., back surface) of which can be manufactured as desired by milling, grinding and polishing.

"Injection molding" is an efficient method for producing plastic spectacle lenses or semi-finished spectacle lenses in large numbers. In contrast to casting, the plastic (polymer) is already present in granulated form in the case of injection molding. Exemplary plastic materials are thermoplastics such as PMMA (polymethylmethacrylate), PC (polycarbonate), and PS (polystyrene). The granules are melted in the injection cylinder, converted into a homogeneous melt, and injected into the corresponding tool mold at high pressure. After a short cooling phase, the spectacle lenses molded in this way have attained a sufficient dimensional stability and can be removed from the tool mold.

In both cases, by means of the tool mold—besides the desired shape—a code or an identification can be embossed into the semi-finished spectacle lens. During casting/molding, therefore, a code embossed in the tool mold is transferred or molded onto each semi-finished spectacle lens produced by said tool mold. A unique identification of an individual semi-finished spectacle lens is not possible, rather only a subsequent assignment of tool and semi-finished spectacle lens. Alternatively, a code can be embossed into the semi-finished spectacle lens by means of laser engraving.

SUMMARY

In view of the related art, one object of the present disclosure may consist in providing an improved method for producing, in particular for identifying, a spectacle lens or semi-finished spectacle lens. In particular, it would be desirable to enable an identification of semi-finished spectacle lenses with a small space requirement in conjunction with typically good readability of the identification. Furthermore, it would be desirable to enable an individualization at the earliest possible point in time in the manufacturing process.

A first aspect of the disclosure therefore proposes providing a method for producing a semi-finished spectacle lens, characterized by the step of identifying the semi-finished spectacle lens by applying a (detachable) sticker on the semi-finished spectacle lens, wherein the sticker has a code for unique identification of the semi-finished spectacle lens. The semi-finished spectacle lens has a second code embossed into the semi-finished spectacle lens, wherein the sticker is applied on the semi-finished spectacle lens in such a way that the sticker at least partly covers the second code embossed into the semi-finished spectacle lens.

The inventors have recognized that in the case of the methods for identifying in manufacturing as used in the prior art, the problem still exists that a not insignificant part of the lens surface is taken up by the code. This holds true particularly if a large number of parameters such as, for example, the geometric properties of the tool mold and thus of the semi-finished spectacle lens are intended to be coded. Furthermore, conventionally codes cannot be removed in a straightforward way since the codes are embossed into the lens material and thus necessitate a mechanical surface aftertreatment, even if no material removal would be necessary for producing the final shape of the spectacle lens at the position of the code.

A semi-finished spectacle lens additionally undergoes one or more manufacturing steps to yield the finished spectacle lens. Contrary to the conventional approach with a code being embossed directly into the spectacle lens material in order to be able to undergo further manufacturing steps, the inventors have recognized that instead, surprisingly, a sticker can be applied to the semi-finished spectacle lens during manufacturing. Surprisingly, such an identification is already possible at an early point in time in manufacturing, in particular directly after release from the tool mold for injection molding or casting. The sticker has a code for unique identification of the semi-finished spectacle lens. Consequently, the surface is not damaged. After the sticker has been removed, the corresponding region can manifest its desired optical and cosmetic effect.

By virtue of the sticker having a code for unique identification of the semi-finished spectacle lens, not only is a subsequent assignment of tool and semi-finished spectacle lens possible, but an individual lens element can be tracked. By way of example, if a multiplicity of semi-finished spectacle lenses are produced and, after approximately half of the elements to be processed, a problem occurs or a manufacturing parameter "drifts away" then in the case of conventional identification by means of a code embossed in the tool mold, for safety or in order to satisfy the desired high quality requirement, it was necessary to segregate the entire batch and not use it any further. By virtue of the semi-finished spectacle lenses being individually identified, however, it is possible to ascertain the point when a problem occurred, with the result that unaffected elements can continue to be used. Furthermore, in the case of parameters drifting away, targeted countermeasures can be taken by virtue of the fact that an individual correction value for affected elements can be taken into account in subsequent manufacturing steps. In particular, the unique identification of a semi-finished spectacle lens by means of a sticker makes it possible to use so-called big data analyses in the mass production of spectacle lenses. An identification at an early point in time in manufacturing furthermore enables a linking with a manufacturing time in the form of a time stamp or a virtual time stamp, for example, which can be linked with the unique code.

A second aspect of the present disclosure proposes a semi-finished spectacle lens with a (detachable) sticker, wherein the sticker has a code for unique identification of the semi-finished spectacle lens. The semi-finished spectacle lens has a second code embossed into the semi-finished spectacle lens, wherein the sticker is applied on the semi-finished spectacle lens in such a way that the sticker at least partly covers the second code embossed into the semi-finished spectacle lens.

A third aspect of the present disclosure proposes the use of a (detachable) sticker for identifying a semi-finished spectacle lens and/or for tracking a semi-finished spectacle lens in manufacturing, wherein the use typically comprises applying the sticker on the semi-finished spectacle lens, and wherein the sticker has a code for unique identification of the semi-finished spectacle lens. The semi-finished spectacle lens has a second code embossed into the semi-finished spectacle lens, wherein the sticker is applied on the semi-finished spectacle lens in such a way that the sticker at least partly covers the second code embossed into the semi-finished spectacle lens.

A fourth aspect of the present disclosure proposes an apparatus for processing a semi-finished spectacle lens comprising a receptacle for a semi-finished spectacle lens; and an apparatus for applying a (detachable) sticker to the semi-finished spectacle lens, wherein the sticker has a code for unique identification of the semi-finished spectacle lens. Typically, the apparatus furthermore comprises a reading device for reading the code and a data interface, wherein the apparatus is configured to register the code in a database.

A further aspect of the present disclosure proposes a method for processing a semi-finished spectacle lens, wherein the method comprises the following steps:

providing a semi-finished spectacle lens;

applying a sticker to the semi-finished spectacle lens, wherein the sticker typically has a code for unique identification of the semi-finished spectacle lens;

reading out the code in a downstream manufacturing step; and processing the semi-finished spectacle lens on the basis of the read-out code of the sticker.

A further aspect of the present disclosure proposes a method for producing, in particular for identifying, a semi-finished spectacle lens, wherein the method comprises the following steps:

providing a semi-finished spectacle lens;

reading out a code from at least one tool mold that was used to mold at least one surface of the semi-finished spectacle lens;

applying a sticker to the semi-finished spectacle lens, wherein the sticker typically has a code for unique identification of the semi-finished spectacle lens;

assigning the code of the tool mold and the code of the sticker. It goes without saying that these steps can advantageously be combined with the steps of the method in accordance with the first aspect.

In other words, it is thus possible to produce a connection between the unique code of the sticker and the code of the tool mold. Typically, a first code of a first tool mold, e.g., for molding a front surface of the semi-finished spectacle lens, and/or a second code of a second tool mold, e.g., for molding a back surface of the semi-finished spectacle lens, are/is read out and the assignment to the code of the sticker is produced. Consequently, in subsequent manufacturing steps it is no longer necessary to read out one or two separate codes. Instead, the code of the sticker can be read out and, thanks to the assignment to the codes of the tool mold(s), information about one or more surfaces of the semi-finished spectacle lens can be obtained.

A further aspect of the present disclosure provides a method for producing a semi-finished spectacle lens comprising the following step: Identifying the semi-finished spectacle lens by applying a (detachable) sticker on the semi-finished spectacle lens, wherein the sticker has a code for unique identification of the semi-finished spectacle lens; and wherein the sticker is used as a reference for at least one control region or a coordinate system of the semi-finished spectacle lens, in particular a reference for a coordinate system with four quartiles, wherein the semi-finished spectacle lens has a second code embossed into the semi-finished spectacle lens, and wherein the method furthermore comprises the following steps:

reading out the code of the sticker from a first side of the semi-finished spectacle lens; and reading out the embossed second code from a second side of the semi-finished spectacle lens.

A further aspect of the present disclosure provides a method for producing a semi-finished spectacle lens comprising the following step: identifying the semi-finished spectacle lens by applying a (detachable) sticker on the semi-finished spectacle lens, wherein the sticker has a code for unique identification of the semi-finished spectacle lens; and wherein the sticker is used as a reference for at least one control region or a coordinate system of the semi-finished spectacle lens, in particular a reference for a coordinate system with four quartiles; wherein the sticker is applied on the semi-finished spectacle lens with a positioning accuracy from a group of ±1 mm, ±500 µm, ±200 µm, ±100 µm, ±50 µm, ±20 µm, ±1° and ±0.5° angular accuracy relative to a center of the semi-finished spectacle lens.

One advantage of this configuration may be that surfaces to be processed can be oriented or determined in a simpler manner during the manufacturing method. The sticker can flexibly be applied on a surface of the semi-finished spectacle lens that has not yet been processed to completion, or else on a surface of the semi-finished spectacle lens that has already been processed to completion, and serves as a reference there. The sticker can form a reference without the possibly already finished surface being damaged. Optionally, a marking embossed into the semi-finished spectacle lens can be at least partly covered by the sticker. The sticker can be used as a new identification or as a new reference for identifying control regions or as a new reference for a coordinate system, for example with quartiles such as e.g., Q1, Q2, Q3, Q4. An improved accuracy of subsequent manufacturing steps can be achieved as a result.

A further advantage may be that more expedient manufacturing equipment can be used. A sticker as a reference or with a coordinate system may be easier to read out than a reference embossed into the semi-finished spectacle lens. The sticker can replace or supplement a reference embossed into the semi-finished spectacle lens. The sticker can be positioned on the semi-finished spectacle lens in such a way that it can serve as a reference for subsequent manufacturing steps. In particular, the sticker can be applied on the semi-finished spectacle lens with a positioning accuracy from a group of ±1 mm, ±500 µm, ±200 µm, ±100 µm, ±50 µm, ±20 µm. The sticker can be applied on the semi-finished spectacle lens with a positioning accuracy from a group of ±2°, ±1° and ±0.5° angular accuracy relative to a center of the semi-finished spectacle lens. The center of the semi-finished spectacle lens can relate to a center of the back surface of the semi-finished spectacle lens. As a result, the sticker as such can be used as a reference for subsequent manufacturing steps. This results in a synergistic effect that goes beyond pure data communication of data stored in a code. Alternatively or additionally, the code of the sticker can be a data matrix code. The data matrix code can form the reference for the coordinate system of the semi-finished spectacle lens. As a result, the sticker as such can be used as a reference for subsequent manufacturing steps. This results in a synergistic effect that goes beyond pure data communication of data stored in a code.

Unless specified otherwise, the terms used herein should be understood within the meaning of the DIN EN ISO 13666:2013-10 standard from the Deutsches Institut für Normung e.V. [German Institute for Standardization].

Pursuant to section 5.8 of the DIN EN ISO 13666:2012 standard, the term front surface or object-side surface denotes that surface of a spectacle lens intended to face away from the eye in the spectacles. Pursuant to section 5.9 of the DIN EN ISO 13666:2013-10 standard, the term back surface or eye-side surface denotes that surface of a spectacle lens intended to face the eye in the spectacles. The terms front surface (front side) and back surface (back side) are used here, mutatis mutandis, for a semi-finished spectacle lens.

In the context of the present disclosure, the term semi-finished spectacle lens may denote a spectacle lens or a precursor of a spectacle lens which still has to undergo at least one manufacturing step. Exemplary manufacturing steps are processing of at least one surface, fitting by grinding for a frame (edging), coating, tinting, etc., but not the mounting of the finished spectacle lens into the frame of a pair of spectacles. A semi-finished spectacle lens may relate in particular to a lens blank, blank, spectacle lens blank or spectacle lens semi-phase product pursuant to at least one of sections 8.4.1 and 8.4.2 of the DIN EN ISO 13666:2013-10 standard, that is to say in particular to a lens blank or blank having only one optical surface processed to completion. A semi-finished spectacle lens may furthermore relate to a spectacle lens before edge processing, in particular an unedged spectacle lens pursuant to section 8.4.7 of the DIN EN ISO 13666:2013-10 standard.

A sticker is typically equipped with a self-adhesive surface on one side, said surface being configured for adhesive fixing on lens material. The sticker can be chemically resistant. An adhesive bond or an adhesive of the sticker is typically designed such that it is resistant to mechanical influences.

In one configuration, provision can be made for the method to comprise applying the sticker on a front or back side of the semi-finished spectacle lens. In particular, the sticker can also be applied within a used region for a final spectacle lens shape. Mechanical embossing into a surface of the semi-finished spectacle lens is not necessary.

Typically, the sticker can be a detachable sticker. In the context of the present disclosure, a detachable sticker can also be understood to be a destructively removable sticker. One advantage of this configuration is that a surface covered by the sticker can be uncovered again. The surface can thus be employed once again for some other use. By way of example, the surface can be uncovered after a parameter for a subsequent manufacturing step has been read out. Alternatively, the sticker can also be applied on a surface of the semi-finished spectacle lens which is at least part of a used region or a final spectacle lens shape.

Optionally, the method can comprise the following steps: producing the semi-finished spectacle lens by casting or injection molding; applying the sticker on the semi-finished spectacle lens after the casting or injection molding. Optionally, alternatively or additionally, the method can comprise the following steps:—surface processing of a front and/or back surface of the semi-finished spectacle lens; wherein the step, in particular for a first step, of applying the sticker on the semi-finished spectacle lens is carried out before the step of surface processing of the front and/or back surface of the semi-finished spectacle lens. In particular, the sticker can be applied directly after casting or injection molding e.g., after release from the shell. The inventors have discovered that the identification with a sticker can withstand subsequent processing steps in lens manufacturing, such that despite the use of a sticker, an identification can be effected at a very early point in time even before further processing steps for surface processing.

Optionally, the method comprises the following step:— tracking the individual semi-finished spectacle lens in manufacturing by way of a multi-stage manufacturing process on the basis of the sticker with the code for unique identification of the semi-finished spectacle lens (1), said sticker having been applied on the unique identification of the semi-finished spectacle lens. Optionally, alternatively or additionally, the method can comprise the following steps: reading out the code for unique identification of the semi-finished spectacle lens; interrogating at least one correction parameter (for a subsequent processing step) on the basis of the code; and applying the correction parameter in the subsequent processing step. In particular, a correction parameter for a subsequent processing step can be interrogated and applied. One advantage of this configuration may consist in a better yield during manufacturing. Correction parameters can be obtained for example by analyzing earlier spectacle lenses or semi-finished spectacle lenses. By way of example, the correction parameter can counteract possible trends or drifting of manufacturing parameters.

Furthermore, an actual refractive power, also referred to as true power, can be established slightly differently for example for each casting with respect to basic curve, position in the batch polymerization, without the process drifting away. Furthermore, an actual refractive index, also referred to as true index, can differ slightly from semi-finished product to semi-finished product. One or both values can be interrogated and then later influence the prescription surface calculation as a variable and thus enable more accurate Rx spectacle lenses. In this case, particularly in the case of manufacturing parameter drift, methods of so-called big data analysis can typically be used. A manufacturing parameter or correction parameter can be interrogated for example from a database of a process control. In other words, the sticker code does not necessarily directly contain parameters or data, but rather only a unique (optionally partly encrypted) number. The associated information and data are present for example in a database, referred to for example as LODB or "Lens Order Data Base," and can be interrogated or retrieved and be taken into account in a processing step that follows directly or later.

Optionally, the semi-finished spectacle lens can have a second code embossed into the semi-finished spectacle lens. The sticker can be applied to the semi-finished spectacle lens in such a way that the sticker at least partly covers the second code. One advantage of this solution consists in a small area requirement. A further advantage is that less area is thus covered, which facilitates a cosmetic test of the opposite front surface.

In particular, the sticker can completely cover the second code. By way of example, a molded tool code can be adhesively covered congruently by the casting or injection molding. By way of example, the sticker can be positioned with an accuracy of at least one from ±2° rotation and ±0.5 mm position on the second code. One advantage of this solution is that the code which needs to be taken into account for unique identification is clear for the subsequent manufacturing steps. Therefore, a reader does not have to differentiate between the code of the sticker and the covered second code. In particular, no incorrect code is read in. An error rate can thus be reduced.

Typically, the semi-finished spectacle lens can thus have a second code embossed into the semi-finished spectacle lens, wherein the method in accordance with the first aspect can furthermore be characterized in that the sticker is applied on the semi-finished spectacle lens in such a way that the sticker at least partly covers the second code embossed into the semi-finished spectacle lens. The second code can also be applied on the semi-finished spectacle lens in such a way that the sticker completely covers the second code embossed into the semi-finished spectacle lens.

In particular, the semi-finished spectacle lens can furthermore have a third code embossed into the semi-finished spectacle lens, and wherein the sticker is applied to the semi-finished spectacle lens in such a way that the sticker at least partly leaves free the third code embossed into the semi-finished spectacle lens. By way of example, the third code can be a human-readable code, such as an alphanumeric code, for example. One advantage of this configuration is that the third code thus still remains accessible and can enable for example a rapid identification of a basic shape such as e.g., a front surface curvature or a material e.g., comprising a UV absorber.

Optionally, the semi-finished spectacle lens can have a second code embossed into the semi-finished spectacle lens, wherein the method furthermore comprises the following steps: reading out the code of the sticker from a first side of the semi-finished spectacle lens and reading out the embossed second code from a second side of the semi-finished spectacle lens. In particular, the second code can be embossed on the first side of the semi-finished spectacle lens; wherein the sticker is applied on the same side of the semi-finished spectacle lens as the second code; and wherein the sticker typically at least partly covers or overlaps the second code. One advantage of this solution consists in a small area requirement, the respective code nevertheless being able to be read out. Since the spectacle lens material is transparent, the embossed code, even though it is situated on the same side as the sticker, can be read out from the other side through the spectacle lens.

Typically, the sticker can consist of a material which is recyclable together with lens material of the semi-finished spectacle lens. Alternatively or additionally, the sticker can consist of a material which can be cut or removed together with the lens material. The sticker can typically be a machinable sticker. One advantage of this solution is that the sticker does not have to be removed separately before the surface processing. A subsequent separation of lens material and sticker material can also be obviated. In particular, the sticker can thus serve for a temporary identification during manufacturing.

The sticker is typically vacuum-stable. In other words, the sticker is embodied in such a way that it does not outgas in a vacuum. Vacuum can be defined here as a pressure of ≤100 mbar. By way of example, the sticker is embodied in such a way that it loses not more than 2, typically not more than 1, typically not more than 0.5, typically not more than 0.1, percent by mass or percent by volume in a vacuum. One advantage of this configuration is that the sticker can remain on the semi-finished spectacle lens during further processing steps. The lens can thus be processed further together with the sticker. It should be noted here that in the case of conventional stickers outgassing is sometimes a technically desired process, e.g., during the curing of adhesive bonds. By way of example, the sticker can comprise an adhesive comprising an acrylate compound. A vacuum-stable silicone adhesive can alternatively be used. The inventors have recognized that one advantage of this solution may be that an optical surface is not contaminated even during high-vacuum processes. Typically, no adhesive based on silicone compounds is used.

Typically, the sticker has a thermal stability of at least one from more than 100° C., more than 115° C., more than 130° C. or more than 140° C. One advantage of this configuration is that the sticker can remain on the semi-finished spectacle lens during further processing steps of the semi-finished spectacle lens, for example during so-called curing or hardening. The lens can thus be processed further together with the sticker.

Typically, the sticker is resistant vis-á vis one or more subsequent processing steps in lens manufacturing such as, for example, in relation to low pressure or high pressure cleaning, for example using water (or so-called surface scrubbing). In particular, the sticker is embodied in such a way that it withstands high pressure cleaning at one from more than 80 bar, more than 100 bar, more than 120 bar or more than 150 bar. Typically, the sticker is resistant to cleaning agents, and/or hydroxide solutions, and/or (distilled) water and/or KOH. Typically, the sticker is UV-resistant. Typically, the sticker is embodied in such a way that the adhesion persists during vacuum processes. Typically, the sticker exhibits transport stability, in particular thermal stability, e.g., vis-à vis temperatures of between −20° C. and +60° C., and/or moisture resistance in particular vis-à vis fluctuations in air humidity. Typically, once the sticker has been applied to the semi-finished spectacle lens, said sticker has a storage life of at least 6 months, typically of at least 12 months. Typically, the sticker is embodied in such a way that it adheres on a rough surface, in particular a surface processed by laser engraving. Typically, the sticker has a low-reflection surface. One advantage of this configuration is better readability.

Typically, the sticker can be embodied in semitransparent fashion. One advantage of this configuration is that a visual inspection is still possible. Particularly with the use of large-area stickers, a check for possible underlying defects can thus still take place.

In one configuration of the method, the sticker can form a reference for at least one control region or a coordinate system of the semi-finished spectacle lens, in particular a reference for a coordinate system with four quartiles. By way of example, a conventionally engraved or embossed reference point or code can be replaced or supplemented by the sticker. A cast or injection-molded tool code e.g., of a mold shell is usually situated in a predetermined location. By way of example, during casting the mold shells with code are used such that the code is in the vertical on a filling funnel. Consequently, the position when sticking the sticker over is clear and can be obtained as a new reference by the sticker. In particular, the sticker can be applied on a surface of the semi-finished spectacle lens that has already been processed to completion, and forms a reference there without the finished surface being damaged. By way of example, a cast or injection-molded tool code, e.g., of a mold shell, is always situated in a specific location. By way of example, during casting the mold shells with code are used such that the code is in the vertical on a filling funnel. Consequently, the position when sticking the sticker over is clear.

Typically, the sticker can have information regarding the location and/or type of defects in the semi-finished spectacle lens. By way of example, it is possible to store coordinates of bubbles that arise during casting/molding in the semi-finished spectacle lens or lens blank.

Typically, the sticker has a code with at least one manufacturing parameter for a downstream processing step. One advantage of this embodiment is that such information can be transferred to a downstream manufacturing step directly, for example by means of a code contained on the semi-finished spectacle lens. In this regard, by way of example, a manufacturing machine can be set by means of the sticker. Optionally, the manufacturing parameter on the sticker can be coordinated with a manufacturing parameter planned for this semi-finished spectacle lens and plausibilation or error correction can thus be effected. In this regard, by way of example, an incorrectly sorted element can be recognized. Manufacturing parameters can be understood to mean information regarding process parameters, properties of a surface to be produced, etc. The sticker or the code of the sticker can have a manufacturing parameter directly, i.e. encoded in the code, or indirectly, wherein one or more associated manufacturing parameters can be retrieved from a database by means of the code for unique identification.

Optionally, the sticker can have at least one feature for authenticity checking and/or a color coding. By way of example, a hologram, logo, watermark or some other feature for authenticity checking can be provided. The feature for authenticity checking can be a code which can be part of a hologram. One advantage of this solution is that the authenticity or origin of the semi-finished spectacle lens can be verified. One advantage of a color coding consists in a simple visual identification, for example directly by a user. Optionally, the color coding can represent further information, e.g., different UV transmissions of the substrate material. Consequently, the same mold shells can be used for different material properties and the product differentiation is effected by way of the color coding.

Optionally, the apparatus in accordance with the fourth aspect can be configured to read out a second code embossed into the semi-finished spectacle lens; to determine a curvature of the semi-finished spectacle lens on the basis of the embossed second code; and to apply the detachable sticker to the semi-finished spectacle lens taking account of the curvature of the semi-finished spectacle lens. Semi-finished spectacle lenses usually have curved surfaces. This can result in creasing when a sticker is applied. By virtue of the fact that on the basis of the embossed second code, which typically has information about the curvature of the semi-finished spectacle lens or at least enable such information to be interrogated, the curvature of the semi-finished spectacle lens can be determined, there is no need for complicated measurement of the curvature before the sticker is applied. Consequentially, the sticker can be applied in a simple manner taking account of the curvature, as a result of which creasing can be avoided or at least reduced.

The advantages described in detail above for the first aspect of the disclosure apply accordingly to the further aspects of the disclosure.

It goes without saying that the aforementioned features and those yet to be explained below can be used not only in the combination specified in each case but also in other combinations or on their own, without departing from the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
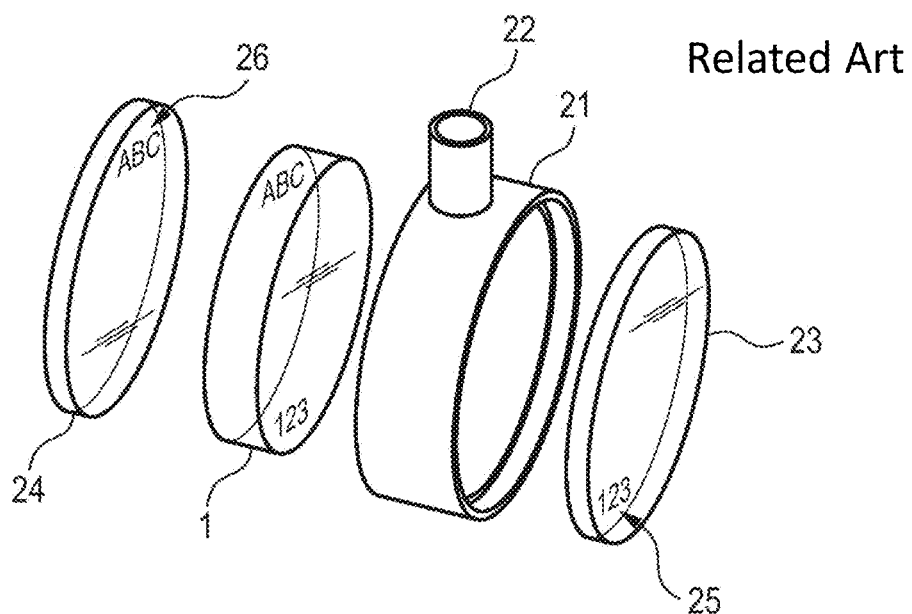
FIG. 1 shows elements for the casting of a semi-finished spectacle lens.

FIG. 1 shows a tool mold for so-called casting that is known from the related art. The tool mold comprises a central element 21 having an attachment 22 and also a front-side tool mold or mold shell 23 and a back-side tool mold or mold shell 24. During casting, the thermosetting plastic allyl diglycol carbonate is usually used in spectacle optics, this being known by the tradename CR39, for example. The latter can also be introduced into the element 21 through the attachment 22, said element being closed off by the tool mold 23 on the front side and by the tool mold 24 on the back side. A semi-finished spectacle lens 1 is thus produced.

Besides the desired surface shape, the front- and/or back-side tool mold 23, 24 can have a code 25, 26, which is correspondingly embossed into the semi-finished spectacle lens. During casting/molding, therefore, a code embossed in the tool mold is transferred or molded onto each semi-finished spectacle lens 1 produced by said tool mold 23, 24. A unique identification of an individual semi-finished spectacle lens 1 is not possible, rather only a subsequent assignment of tool and semi-finished spectacle lens.

Figure 2:
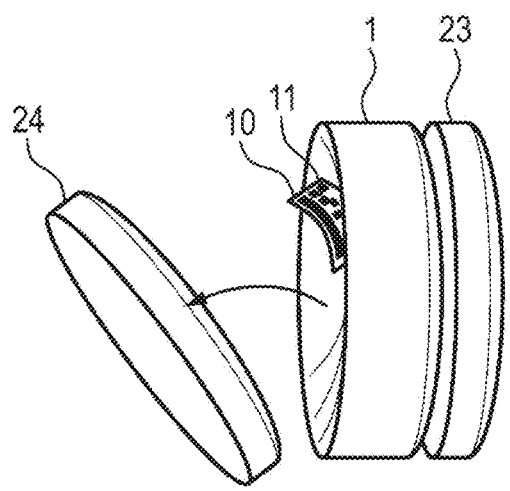
FIG. 2 shows the process of applying a sticker on a semi-finished spectacle lens.

By contrast, FIG. 2 shows the identification of a semi-finished spectacle lens 1 in accordance with the present disclosure, wherein a (detachable) sticker 10 is applied to the semi-finished spectacle lens 1. Typically, the sticker 1 can have a code 11 for unique identification of the semi-finished spectacle lens 1. In the present exemplary embodiment, the sticker 10 is applied on a back surface of the semi-finished spectacle lens 1 after the back-side tool mold 24 has released the back-side surface of the semi-finished spectacle lens 1. This is illustrated schematically by the arrow.

Typically, the sticker can thus be applied on the semi-finished spectacle lens at a point in time as early as possible, if not even the earliest possible point in time. The sticker can be applied in particular before a first step of the surface processing of the front and/or back surface of the semi-finished spectacle lens. Individual semi-finished spectacle lenses can thus be tracked from the beginning of manufacturing.

The code 11 can typically be a machine-readable code such as a QR code or DMC code, for example. Alternatively or additionally, an alphanumeric code can be provided. Alternatively or additionally, a color coding can be provided. One advantage of this configuration is a fast visual identification.

Optionally, the sticker 10 and/or code 11 can have a size of at least one from at least 1 mm$^2$, at least 4 mm$^2$, at least 9 mm$^2$, at least 16 mm$^2$, at least 25 mm$^2$, at least 36 mm$^2$, at least 64 mm$^2$, at least 100 mm$^2$, at least 144 mm$^2$, at least 196 mm$^2$, at least 256 mm$^2$, at least 324 mm$^2$, and at least 400 mm$^2$. One advantage of a detachable sticker may be that it can be larger than a permanently embossed code. Thus the readability (by machines and by human beings) can be improved and a risk of read-out errors can be reduced.

The mass production of spectacle lenses usually takes place in a multi-stage manufacturing process. By way of example, firstly semi-finished spectacle lenses are produced in large numbers. In subsequent processing steps, said semi-finished spectacle lenses can be adapted to the exact optical power required for a user, can be coated, and can subsequently be adapted to a desired frame shape for the user.

The production of the semi-finished spectacle lenses is not necessarily carried out at the same location as a subsequent user-specific adaptation, for example. By virtue of the fact that a sticker having a code for unique identification of the semi-finished spectacle lens is already applied to the semi-finished spectacle lens at an early stage of manufacturing, an individual lens element can be continuously identified and tracked over typically the entire manufacturing process. Typically over the entire manufacturing process from mass production of the blanks through customized adaptation to hand over to the customer.

Figure 3:
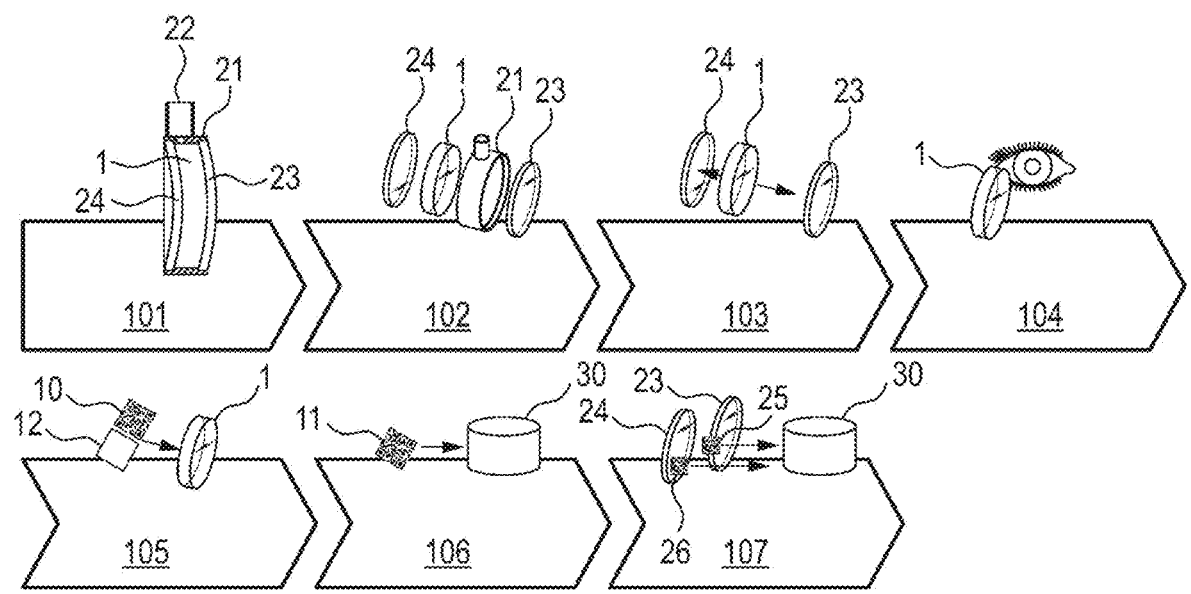
FIG. 3 shows a flow diagram of method steps in the context of casting.
Figure 4:
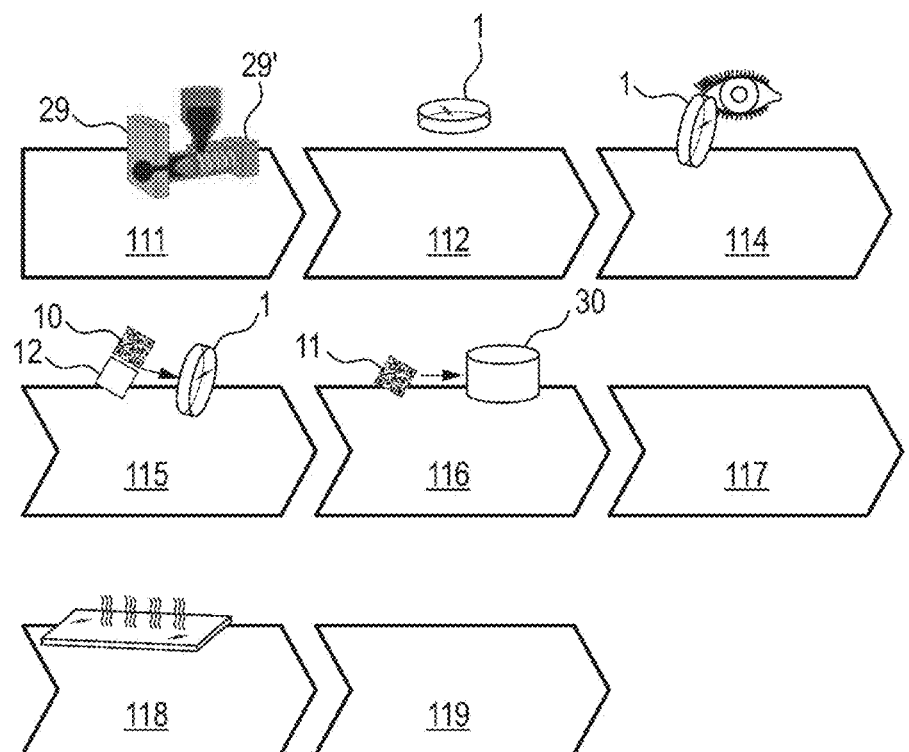
FIG. 4 shows a flow diagram of method steps in the context of injection molding.

FIGS. 3 and 4 show exemplary sequences for producing a semi-finished spectacle lens including applying a sticker on the semi-finished spectacle lens by casting (FIG. 3) and injection molding (FIG. 4).

In accordance with FIG. 3, in a first step 101, the semi-finished spectacle lens 1 can be produced by casting. For example using an apparatus as already shown in FIG. 1. In a second step 102, firstly the element 21 is removed and subsequently, in step 103, the front-side tool mold 23 and the back-side tool mold 24 are opened. In an optional next step 104, a visual inspection of the semi-finished spectacle lens 1 can be carried out.

In the next step 105, the semi-finished spectacle lens 1 is identified by a sticker 10 being applied on the semi-finished spectacle lens 1, wherein the sticker 1 has a code 11 for unique identification of the semi-finished spectacle lens 1. Optionally, a further sticker 12 can be provided, which has for example a feature for authenticity checking and/or a color coding, for example a hologram. However, such elements can also be part of the sticker 10.

As shown in step 106, the code of the sticker 10 can be registered in a database 30. The uniquely identified semi-finished spectacle lens 1 is thus registered. Typically, in step 107, a code 25 of the front-side mold tool 23 and/or a second code 26 of the back-side mold tool 24 are/is additionally registered. This can likewise be carried out in the database 30. By virtue of the code for unique identification of the semi-finished spectacle lens typically being registered together with one or more codes of the mold tool, a unique assignment can be effected. Consequently, it is no longer necessary to read out the respective individual codes possibly embossed into the semi-finished spectacle lens, rather it is possible to carry out an evaluation of the unique code 11. It goes without saying that, in this procedure, an assignment of the tool molds used during manufacturing, like radii of curvature of the front and/or back side of the semi-finished spectacle lens 1, for example, to the code 11 for unique identification of the semi-finished spectacle lens can also be effected in a different way. Optionally, it is also not necessary for the corresponding code to be embossed into a surface of the semi-finished spectacle lens by hardware by means of the tool elements. A usable region of the semi-finished spectacle lens can thus be enlarged, which can be advantageous particularly in the case of large lens elements.

FIG. 4 shows a modification of the method from FIG. 3, wherein the semi-finished spectacle lens 1 is produced by injection molding. The basic sequence of injection molding has already been described in the introduction.

In step 111, a plastic material is melted in an injection cylinder or extruder 29' and is injected at high pressure into a tool mold 29 for producing a semi-finished spectacle lens 1. In step 112, the semi-finished spectacle lens is removed and optionally coated. In the optionally following step 114, a visual inspection can be carried out. This can optionally be a camera-based visual inspection involving the determination of a position of defects such as air inclusions, for example. A usable region can subsequently be defined on the basis of knowledge of said defects. By way of example, it is possible to choose a shape for a finished spectacle lens on the semi-finished spectacle lens in such a way that the latter is not affected by the defects. Rejects can thus be reduced. Optionally, such information can be contained in or linked with the code of the semi-finished spectacle lens.

The subsequent steps 115 and 116 can correspond to steps 105 and 106 already described above. In step 117, analogously to step 107, a connection or link between the unique code of the sticker 11 and the tool mold 29 can be produced. This is also referred to as a so-called matching.

In an optional step 118, the lens material can be cured, for example by being exposed to UV radiation or undergoing a thermal treatment. Typically, the sticker has a thermal stability of at least 100° C., in particular more than 115° C., in particular more than 130° C.

Optionally, in step 119, the semi-finished spectacle lens can be subjected to one or more postprocessing processes. Exemplary post-processes are (i) curing, for example after the injection molding, at 130° C.-140° C. and optionally for a duration of more than 2 hours, in particular more than 5 hours; (ii) surface cleaning, such as cleaning at low or high water pressure; (iii) wet-chemical cleaning and/or activation using a rinsing agent or distilled water; (iv) surface coating, the sticker typically being thermally stable and resistant to caustic substances such as, for example, KOH or UV curing; (v) antireflection coating, typically on that side of the semi-finished spectacle lens on which the sticker is not attached, wherein for this purpose the sticker is typically embodied in vacuum-resistant fashion and, in particular, does not outgas. Typically, the sticker exhibits transport stability, in particular resistance to environmental influences such as temperature of between −20° C. and +60° C., moisture resistance and friction resistance. The sticker can have a storage life of typically not less than 6 months, in particular not less than 12 months. The sticker can consist of a material which is recyclable together with lens material and/or can be removed together with the lens material.

By virtue of the semi-finished spectacle lens being identified by the sticker for unique identification of the semi-finished spectacle lens, early processing steps can already be individualized. By way of example, a so-called "single piece flow" typically a user-specific job, can already be started in mass production. Thus steps of mass production such as curing, etc. can also already be configured user-specifically. Consequently, an individualization can typically already be effected in the early manufacturing steps, which hitherto have not been user-specific. By way of example, a so-called post-curing process can already be individualized depending on the desired end product. Typically, an interposed storage process (DC) can be dispensed with.

Figure 5:
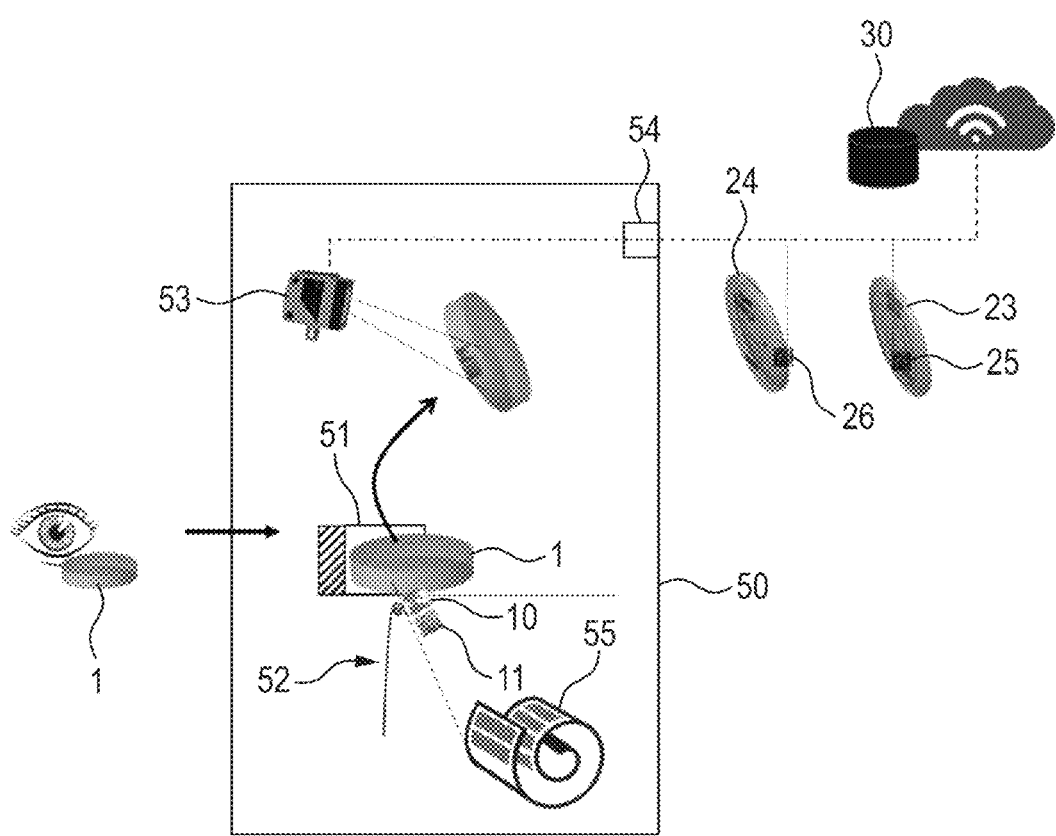
FIG. 5 shows a schematic illustration of an apparatus for applying a sticker to a semi-finished spectacle lens.

FIG. 5 shows an apparatus 50 for processing a semi-finished spectacle lens 1. It goes without saying that not all of the processing steps have to be carried out by this one apparatus, rather further apparatuses can be provided. The apparatus 50 comprises a receptacle 51 for a semi-finished spectacle lens 1 and also an apparatus 52 for applying a sticker 10 to the semi-finished spectacle lens 1, the sticker 10 typically has a code 11 for unique identification of the semi-finished spectacle lens 1.

Optionally, the apparatus 50 can furthermore comprise a reading device 53 for reading the code 11 and a data interface 54, wherein the apparatus 50 is configured to register or store the code in a database 30. In the present example, a plurality of stickers are provided on a roll 55, from which they are then applied by means of the apparatus 52 for applying the sticker to the semi-finished spectacle lens 1.

The assignment of one or more tool molds 23, 24, 29 for producing the semi-finished spectacle lens, said assignment already having been described above with reference to steps 107 in FIG. 3 and 117 in FIG. 4, can optionally likewise be effected in the apparatus 50 or alternatively be a downstream or upstream step.

Optionally, the apparatus (50) can be configured to read out a second code (25, 26) embossed into the semi-finished spectacle lens; to determine a curvature of the semi-finished spectacle lens (1) on the basis of the embossed second code (25, 26); and to apply the detachable sticker (10) to the semi-finished spectacle lens taking account of the curvature of the semi-finished spectacle lens. For this purpose, the apparatus (52) can be mounted in an angularly adjustable manner and a location of the apparatus (52) relative to the semi-finished spectacle lens can be set on the basis of the curvature of the semi-finished spectacle lens, such that the sticker (10) is applied to the semi-finished spectacle lens taking account of the curvature of the semi-finished spectacle lens. In particular, creasing can thus be avoided.

Figure 6:
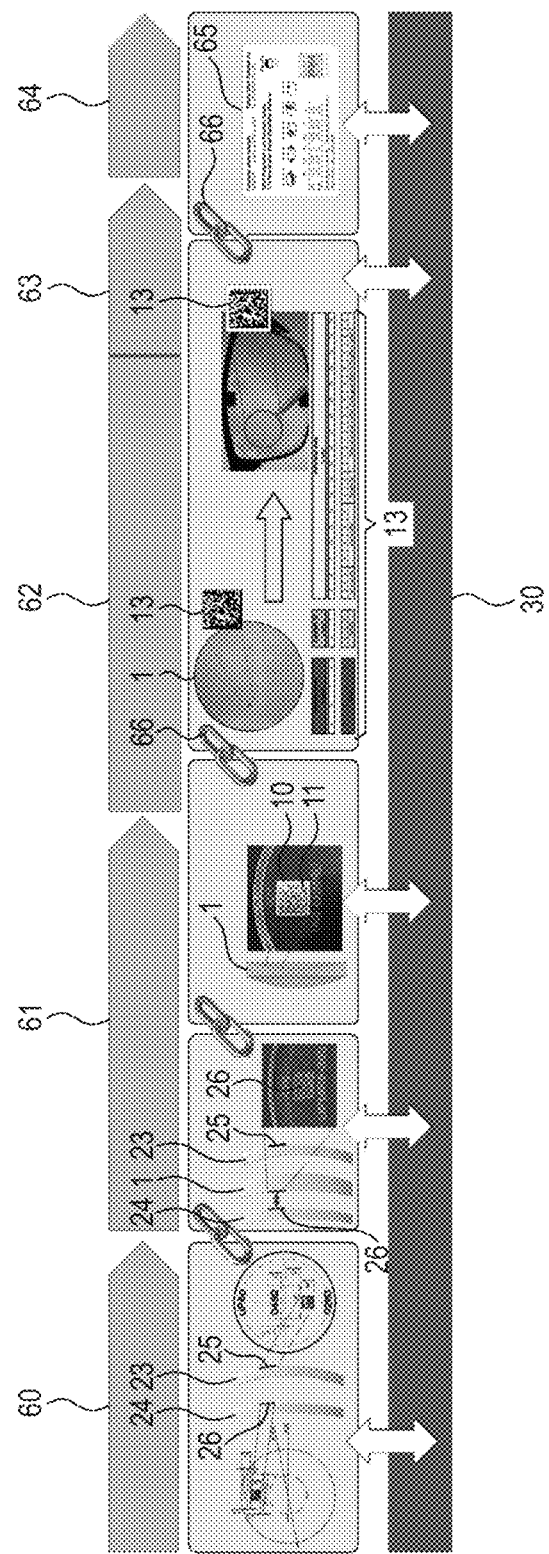
FIG. 6 shows a flow diagram from the mass production of semi-finished spectacle lenses to delivery to the user.

FIG. 6 shows various method steps 61, 62, 63, 64 for producing a spectacle lens. The tool molds or molds 23, 24 can be provided in an upstream step 60. The front-side and/or back-side tool mold 23, 24 can have a code 25, 26. In a first step 61, the mass production of semi-finished spectacle lenses can be carried out using such tool molds. In this case, the front- and/or back-side code 25, 26 of the tool molds can be embossed into the semi-finished spectacle lens. Typically, the codes 25, 26 are registered in a database 30.

As early as during mass production 61, in accordance with the present disclosure, stickers 10 with a code 11 for unique identification can be applied to the semi-finished spectacle lenses. The codes can be registered in a database 30. In particular, a code 11 of a sticker 10 can be linked with the code(s) 25, 26 of the associated tool mold(s) by way of the database 30. It can therefore be sufficient to read out only the code 11 of the sticker 10, instead of both a front-side code 25 of a front-side tool mold 23 and a back-side code 26 of a back-side tool mold 24. The semi-finished spectacle lenses 1 can subsequently be subjected to further processing steps. A linking 66 between the individual semi-finished spectacle lenses 1 from mass production 61 and the possibly already user-specific processing 62 and individualization 63 can be effected thanks to the individual code.

Optionally, a, typically unique, code 13 can be applied to the semi-finished spectacle lens 1 or, depending on the process step, to the finished spectacle lens. This can be done in the context of the customized processing 62, as shown in FIG. 6. The code 13 can once again be registered in a database 30 and be linked with at least one of the codes 11, 25, 26. Optionally, the code 13 can correspond to the code 11. One advantage of this configuration is that a unique assignment is achieved in a simple manner. By way of example, the code 11 can be copied within a machine and can be applied to the spectacle lens or semi-finished spectacle lens, e.g., by means of laser engraving. Not even a database link is required in this case. By way of example, that surface on which the sticker 10 with the code 11 is applied is processed during the processing 62. Machining is carried out, for example, wherein the sticker is concomitantly removed or destructively removed together with spectacle lens material. Thanks to the code 13, a unique identification is still possible even after the sticker has been removed. In the preceding manufacturing steps, the sticker 10 with the code 11 typically offers simpler readability (by machines) than an engraved or embossed code 25, 26, 13.

Typically, the sticker 10 can have a code with at least one manufacturing parameter for a downstream processing step. By way of example, a coating to be applied or at least one parameter of a surface to be manufactured can be encoded. Alternatively or additionally, the sticker has a code (for unique identification of the semi-finished spectacle lens) on the basis of which at least one manufacturing parameter can be interrogated from a database. Optionally, the code itself contains no parameters at all, or the parameters being in a database. The customized adaptation 63 is followed by handover to the customer for use by the latter in step 64. In this case, once again a linking 66 can be effected and the customer can optionally be presented with a documentation card 65 regarding the spectacle lens adapted in a customized manner for said customer. Optionally, a linking with the database 30 can again be effected in this case.

Figure 7:
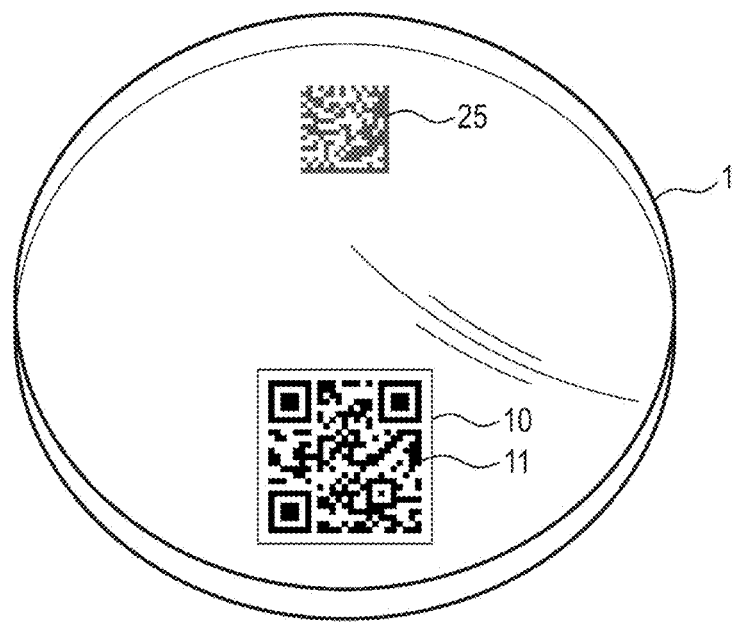
FIG. 7 shows an illustration of an exemplary semi-finished spectacle lens with a sticker.

FIG. 7 shows an illustration of a further exemplary embodiment of a semi-finished spectacle lens 1 with a sticker 10, wherein the sticker has a code 11 for unique identification of the semi-finished spectacle lens. The sticker can be a detachable sticker or a destructively removable sticker. A detachable sticker can relate to a sticker which can be removed again, typically without residues, from the semi-finished spectacle lens 1. Typically, the sticker can be applied once again to the semi-finished spectacle lens, for example after interim surface processing. A destructively removable sticker can relate to a sticker which can indeed be removed, but is destroyed in the process. This can be advantageous particularly if the sticker is used for authenticity checking, since the sticker then cannot be reused.

Typically, the sticker 10 consists of a material which is recyclable together with the lens material from which the semi-finished spectacle lens 1 is produced. By way of example, in this case, a surface processing of that surface on which the sticker 10 is applied can be carried out without the sticker having to be removed beforehand.

Optionally, the sticker can be embodied in semitransparent fashion. Consequently, a visual inspection of the semi-finished spectacle lens 1 is still possible. Optionally, the semi-finished spectacle lens can also have a conventionally embossed second code 25, as shown in FIG. 7. By way of example, this can be a directly readable alphanumeric code or a machine-readable code. A machine-readable two-dimensional DMC code is provided in the present example.

Figure 8:
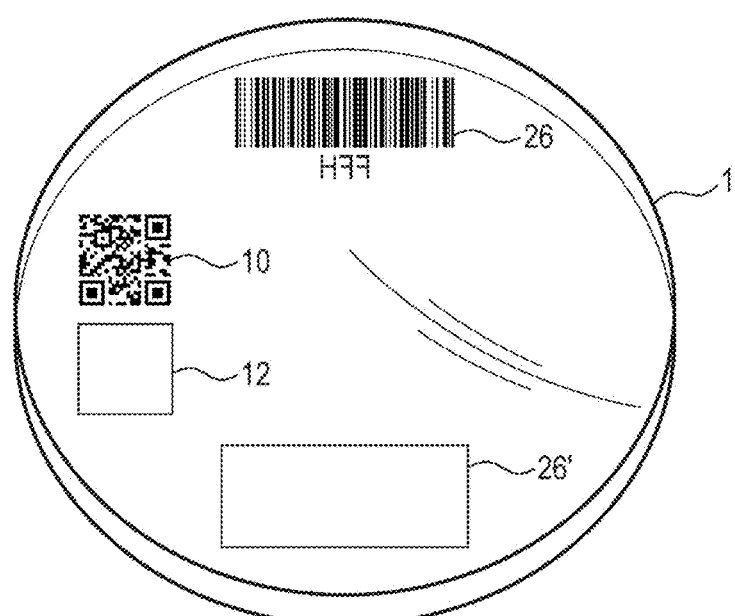
FIG. 8 shows a second illustration of a semi-finished spectacle lens with a sticker.

FIG. 8 shows an illustration of a further embodiment of a semi-finished spectacle lens 1 with a sticker 10. In this case, the machine-readable code 26 is embodied in the form of a barcode with an additional alphanumeric element, which is reproduced in a mirror-inverting manner in this case since it lies on the front side. A further field 26' for further codes can optionally be provided. In the present example, a feature for authenticity checking in the form of a hologram 12 is additionally provided.

Figure 9:
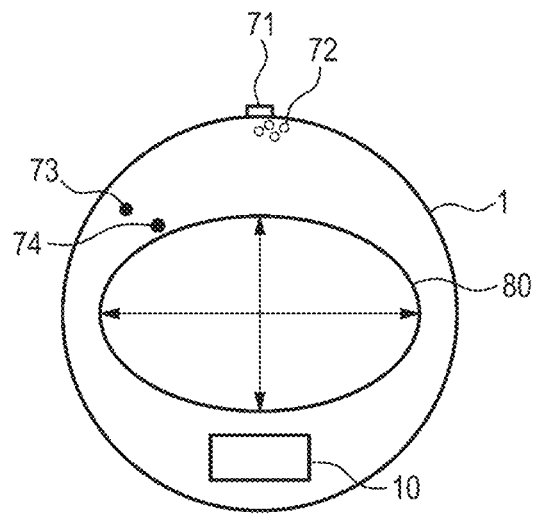
FIG. 9 shows a semi-finished spectacle lens with defects.

FIG. 9 shows an illustration of a semi-finished spectacle lens 1 with defects 72, 73, 74. An attachment 71 can be discerned at the top side of the semi-finished spectacle lens 1, which attachment was used to introduce the spectacle lens material. The formation of bubbles 72 can occur in this region. These are defects that render this region unusable for a final spectacle lens shape. An exemplary final spectacle lens shape is designated by reference sign 80 in FIG. 9. There ought to be no defects within the final spectacle lens shape 80.

In the present case, the semi-finished spectacle lens 1 has even further defects 73 and 74 besides the bubbles 72. However, since said defects lie outside the region of the final spectacle lens 80, they are not relevant. Typically, the semi-finished spectacle lens 1 has a sticker 10 containing information about a potentially usable region 80 for a final spectacle lens and/or information about the location of defects 72, 73, 74. A usable region can thus be determined on the basis of the location of the defects. If only a small usable region is required for a small final spectacle lens, for example, such a semi-finished spectacle lens 1 can continue to be used for production despite the defects 72, 73, 74, with the result that rejects can be reduced. It goes without saying that the corresponding information about defects can also be stored in a database, which can be linked by means of a unique code on the sticker 10.

Optionally, the sticker 10 can also contain information about the production process, for example in the case of production problems regarding a tool, inclusions, polymerization, process parameters, ambient parameters, or information about the optical properties such as the refractive power of the front and/or back surface. It goes without saying that such information can alternatively or additionally also be retrieved from a database, for example the LODB, by way of the code of the sticker.

Figure 10:
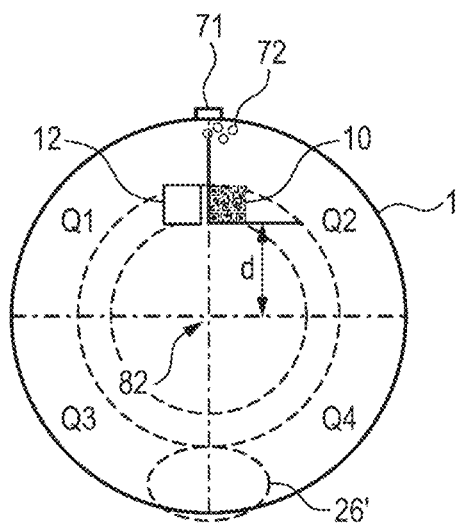
FIG. 10 shows a further illustration of a semi-finished spectacle lens with a sticker.

FIG. 10 shows an illustration of a further embodiment. In this case, a sticker 10 is once again applied on the semi-finished spectacle lens 1. In the present case, the sticker can be used for identification or as a reference for identifying control regions or as a reference for a coordinate system, here with quartiles (Q1, Q2, Q3, Q4). Alternatively or additionally, the marker 10 can also be used as a reference point. By way of example, the sticker can specify a horizontal center and/or a vertical location, here with an offset d with respect to the horizontal. An additional sticker 12 or a further region 12 of the sticker 10 can optionally be provided. On this it is possible to store further information and/or to provide a feature for authenticity checking such as a hologram. Further codes can optionally be applied in the lower region 26'.

Figure 11:
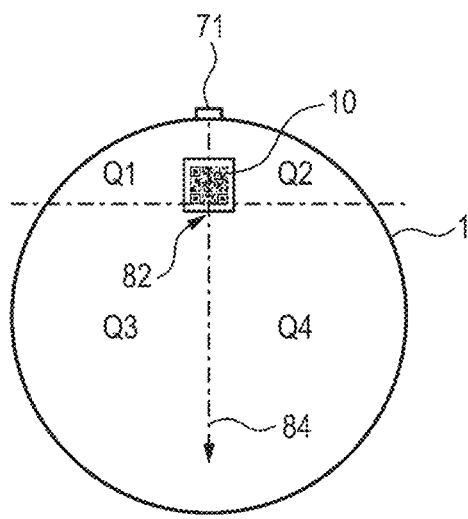
FIG. 11 shows a further illustration of a semi-finished spectacle lens with a sticker.

FIG. 11 shows a further illustration of a semi-finished spectacle lens 1 with a sticker 10, similar to the embodiment shown in FIG. 10. In this example, a system of coordinates or zero point 82 can be determined in a defined manner on the basis of a lower region of the code and a horizontal center. The filling neck or attachment 71 that was used to introduce the spectacle lens material can furthermore be discerned. The filling direction is indicated by arrow 84.

Figure 12A:
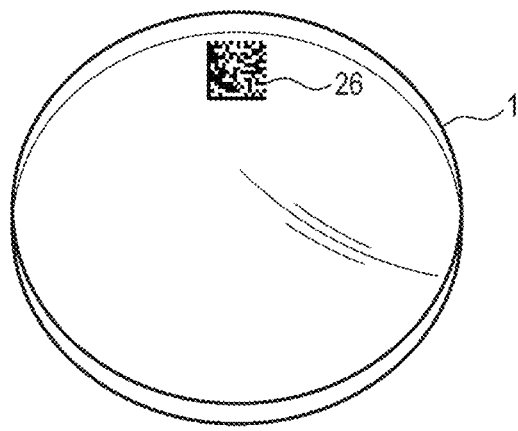
FIG. 12A shows an illustration of a semi-finished spectacle lens with a conventional embossed code.
Figure 12B:
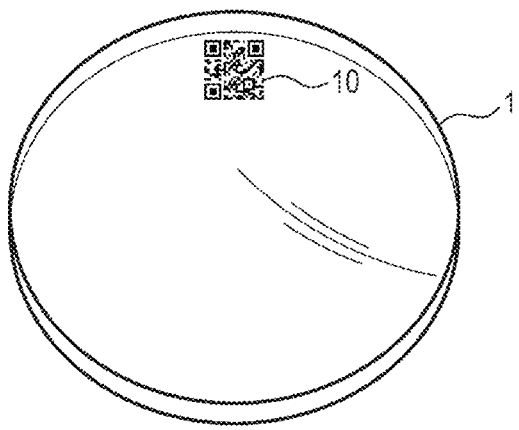
FIG. 12B shows an illustrations of a semi-finished spectacle lens with a sticker having a unique code and an embossed code in the semi-finished spectacle lens from the side showing the sticker.
Figure 12C:
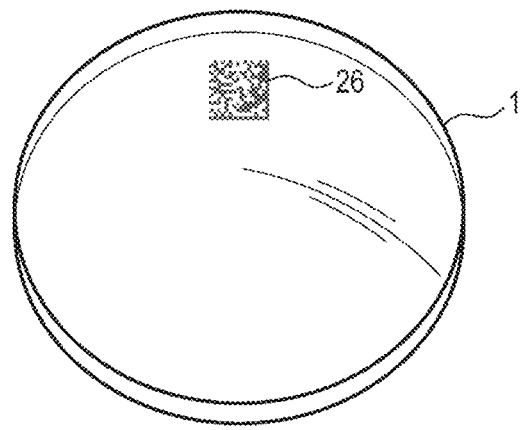
FIG. 12C shows an illustration of the semi-finished spectacle lens of FIG. 12B viewed from the other side.

FIGS. 12A to 12C show an advantageous arrangement of a combination of a first code on a sticker 10 and an embossed second code 26. A conventional code 26 embossed into the semi-finished spectacle lens can be provided on one side of the semi-finished spectacle lens 1. This is a laser-engraved code in the present example. By way of example, this can be a code which is assigned to a back-side tool mold (see FIG. 1) and is thus embossed on a back side. Alternatively or additionally, further information such as, for example, a curvature, a product designation or the like can be provided, which can be used in the subsequent production method.

A sticker 10 can be applied on this code, as shown in FIG. 12B. This sticker can have a code for unique identification of the semi-finished spectacle lens. Typically, the sticker 10 is attached on the semi-finished spectacle lens in such a way that it at least partly overlaps or, as in the present example, completely covers the second code 26. One advantage of this configuration is that no additional space is required on the lens element.

Since the semi-finished spectacle lens 1 is transparent, both the engraved second code 26 and the code on the sticker 10 can nevertheless be read out. By way of example, the code on the sticker 10 can be read out from the back side, whereas the engraved code 26—in a mirror-inverting manner—can be read out through the semi-finished spectacle lens from the front side, as illustrated in FIG. 12C.

The associated method wherein the semi-finished spectacle lens has a second code 26 embossed into the semi-finished spectacle lens can comprise the following steps: reading out the code of the sticker 10 from a first side of the semi-finished spectacle lens 1; and reading out the embossed second code 26 from a second side of the semi-finished spectacle lens 1. Typically, the second code 26 can be embossed on the first side of the semi-finished spectacle lens and the sticker 10 can be applied on the same side of the semi-finished spectacle lens as the second code, wherein the sticker at least partly overlaps the second code.

Figure 13A:
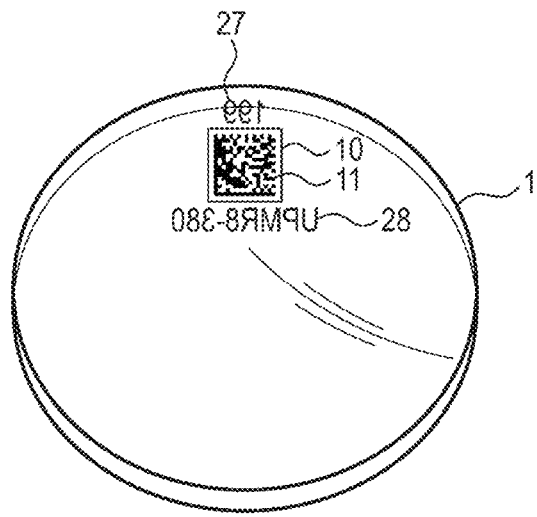
FIG. 13A shows an illustration of a semi-finished spectacle lens with a sticker having a code, a second code embossed into the semi-finished spectacle lens and a further alphanumeric code.
Figure 13B:
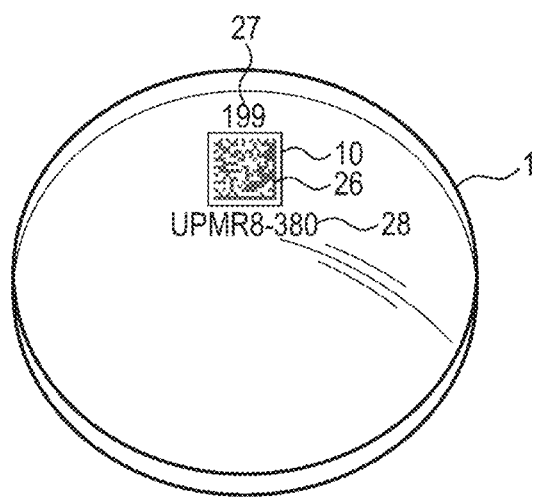
FIG. 13B shows an illustration of the semi-finished spectacle lens of FIG. 13A viewed from the other side of the semi-finished spectacle lens.

FIGS. 13A and 13B show illustrations of a semi-finished spectacle lens 1 with a sticker 10 having a code 11, a second code 26 embossed into the semi-finished spectacle lens, and at least one further optional third code, such as alphanumeric codes 27 and 28, for example. In this case, FIG. 13A shows a view from the back side (here: concave side) of the semi-finished spectacle lens. FIG. 13B shows a view from the front side. The alphanumeric codes 27, 28 are consequentially reproduced in a mirror-inverting manner.

As already described in FIGS. 12A-12C, the sticker 10 can at least partly, typically completely, cover the embossed second code. The sticker 10 can be attached on the same surface as or on a different surface (front or back side) than the embossed second code. If sticker 10 and code 26 are provided on different surfaces, it is possible to determine covering in a direction parallel to the optical axis according to DIN EN ISO 1366-2013-10. In this example, the sticker 10, as shown in FIG. 13A, is attached on the back side. The code 11 of the sticker is thus readable from the back side. From the front side, as shown in FIG. 13B, the embossed second code 26 can still be seen in front of the adhesive surface of the sticker. In other words, a superimposed double code is used.

Optionally, the sticker has one or more third codes, typically alphanumeric codes 27, 28. Such codes can typically be read by an employee in particular without interrogating a database. The sticker (10) can be applied to the semi-finished spectacle lens (1) in such a way that the sticker (10) partly or completely covers the second code (25, 26) embossed into the semi-finished spectacle lens and at least partly, typically completely, leaves free the third code (27, 28) embossed into the semi-finished spectacle lens. By way of example, the code 27 specifies a base curve or base curvature "199" and the code 28 "UPMR8-380" specifies the semi-finished spectacle lens as a "Universal Puck" of the type "MR8" with a UV identifier "UV 380".

Figure 14:
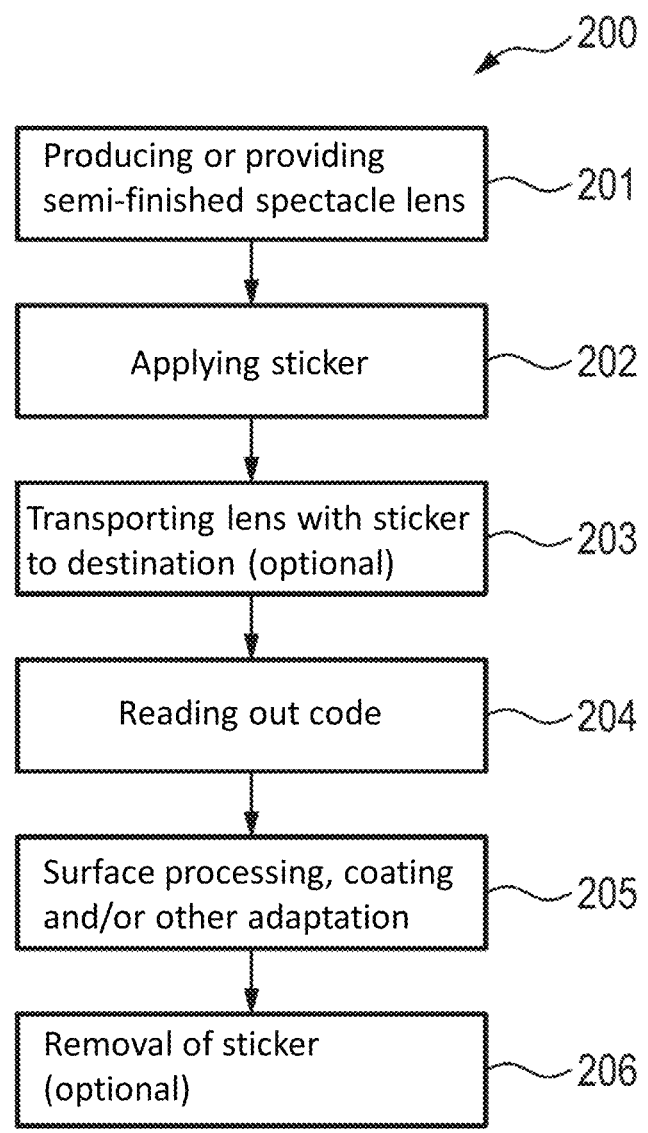
FIG. 14 shows a flow diagram of a method of identifying a semi-finished spectacle lens.

FIG. 14 shows a flow diagram of an exemplary method in accordance with one embodiment of the present disclosure. In step 201, a semi-finished spectacle lens 201 is produced or provided. In step 202, a sticker is applied on the semi-finished spectacle lens, wherein the sticker has a code for unique identification of the semi-finished spectacle lens. Optionally, steps 201 and 202 can be carried out at a different location than subsequent processing of the semi-finished spectacle lens. By way of example, in step 203, the semi-finished spectacle lens with the applied sticker can be transported to a destination.

In step 204, the code of the sticker can be read out. On the basis thereof, in step 205, a customized adaptation can be effected, such as, for example, surface processing, coating or adaptation, in particular of the surface on which the sticker is not applied, to a desired optical correction power of the customer. In principle, all parameters and data or at least a portion thereof can be stored in a database (e.g., the LODB), and not encrypted directly in the code. The unique code can be used as a link to the database for any desired manufacturing step.

In step 206, the sticker can optionally be removed. Alternatively, until handover to the customer, the sticker can remain on the semi-finished spectacle lens or, after adaptation to the customer's frame, can even still remain on the finished spectacle lens, in order thus to enable a complete documentation of the entire manufacturing process from the production of the semi-finished spectacle lens (e.g., in the form of a lens blank) to handover of the finished spectacles to the customer.

The present disclosure furthermore relates to the following clauses.

Clause 1. A method for producing a semi-finished spectacle lens (1), characterized by the step of identifying the semi-finished spectacle lens (1) by applying a detachable sticker (10) on the semi-finished spectacle lens (1), wherein the sticker (10) has a code (11) for unique identification of the semi-finished spectacle lens (1).

Clause 2. The method according to clause 1, characterized by the following steps of:
producing the semi-finished spectacle lens (1) by casting or injection molding; and
applying the sticker (10) after the casting or injection molding on the semi-finished spectacle lens (1);
surface processing of a front and/or back surface of the semi-finished spectacle lens (1);
wherein the step of applying the sticker on the semi-finished spectacle lens is carried out before the step of surface processing of the front and/or back surface of the semi-finished spectacle lens.

Clause 3. The method according to either of the preceding clauses, characterized by the following steps: reading out the code (11) for unique identification of the semi-finished spectacle lens (1); interrogating at least one manufacturing parameter on the basis of the code (11); and applying the manufacturing parameter in a subsequent processing step.

Clause 4. The method according to any of the preceding clauses, characterized in that the semi-finished spectacle lens (1) furthermore has a second code (25, 26) embossed into the semi-finished spectacle lens, and wherein the sticker (10) is applied on the semi-finished spectacle lens (1) in such a way that the sticker (10) at least partly covers the second code (25, 26) embossed into the semi-finished spectacle lens.

Clause 5. The method according to clause 4, characterized in that the semi-finished spectacle lens furthermore has a third code (27, 28) embossed into the semi-finished spectacle lens, and wherein the sticker (10) is applied to the semi-finished spectacle lens (1) in such a way that the sticker (10) at least partly leaves free the third code (27, 28) embossed into the semi-finished spectacle lens.

Clause 6. The method according to any of the preceding clauses, characterized in that the semi-finished spectacle lens (1) has a second (25, 26) embossed into the semi-finished spectacle lens, and wherein the method furthermore comprises the following steps:

reading out the code (11) of the sticker (10) from a first side of the semi-finished spectacle lens (1); and reading out the embossed second code (25, 26) from a second side of the semi-finished spectacle lens (1).

Clause 7. A semi-finished spectacle lens (1) with a detachable sticker (10), wherein the sticker (10) has a code (11) for unique identification of the semi-finished spectacle lens (1).

Clause 8. The semi-finished spectacle lens (1) according to any of the preceding clauses, characterized in that the sticker (10) consists of a material which is recyclable together with lens material of the semi-finished spectacle lens (1).

Clause 9. The semi-finished spectacle lens (1) according to any of the preceding clauses, characterized in that the sticker (10) has a thermal stability of at least one from more than 100° C., more than 115° C., or more than 130° C.

Clause 10. The semi-finished spectacle lens (1) according to any of the preceding clauses, characterized in that the sticker (10) forms a reference for at least one control region of the semi-finished spectacle lens or a coordinate system of the semi-finished spectacle lens, in particular a reference for a coordinate system with four quartiles.

Clause 11. The semi-finished spectacle lens (1) according to any of the preceding clauses, characterized in that the sticker (10) has at least one from a feature (12) for checking authenticity or a color coding.

Clause 12. The semi-finished spectacle lens (1) according to any of the preceding clauses, characterized in that the semi-finished spectacle lens (1) furthermore has a second code (25, 26) embossed into the semi-finished spectacle lens, and wherein the sticker (10) is applied on the semi-finished spectacle lens in such a way that the sticker (10) at least partly covers the second code (25, 26).

Clause 13. The use of a detachable sticker (10) for identifying a semi-finished spectacle lens (1) in manufacturing, wherein the sticker (10) has a code (11) for unique identification of the semi-finished spectacle lens (1).

Clause 14. An apparatus (50) for processing a semi-finished spectacle lens (1) comprising a receptacle (51) for a semi-finished spectacle lens;

an apparatus (52) for applying a detachable sticker (10) to the semi-finished spectacle lens, wherein the sticker has a code (11) for unique identification of the semi-finished spectacle lens;

a reading device (53) for reading the code; and a data interface (54), wherein the apparatus is configured to register the code (11) in a database (30).

Clause 15. The apparatus according to clause 14, characterized in that the apparatus (50) is configured to read out a second code (25, 26) embossed into the semi-finished spectacle lens; to determine a curvature of the semi-finished spectacle lens (1) on the basis of the embossed second code (25, 26); and to apply the detachable sticker (10) to the semi-finished spectacle lens taking account of the curvature of the semi-finished spectacle lens.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for processing a semi-finished spectacle lens comprising:

providing a semi-finished spectacle lens having an embossed code on one of an object side surface or an eye-side surface of the semi-finished spectacle lens;

applying a detachable sticker having a unique code to the surface of the semi-finished spectacle lens having the embossed code to at least partly cover the embossed code;

uniquely identifying the semi-finished spectacle lens by the unique code, wherein the unique code is a machine-readable code;

performing at least one manufacturing step on the semi-finished spectacle lens while having the detachable sticker attached to the semi-finished spectacle lens; and removing the detachable sticker from the spectacle lens after performing one or more manufacturing steps on the spectacle lens.

2. The method as claimed in claim 1, wherein the sticker is a reference for at least one of a reference region or a coordinate system of the semi-finished spectacle lens, the method further comprising:

reading out the unique code of the sticker from a first side of the semi-finished spectacle lens; and reading out the embossed code from a second side of the semi-finished spectacle lens.

3. A method for processing a semi-finished spectacle lens comprising:

providing a semi-finished spectacle lens having an embossed code on a surface;

applying a sticker having a unique code to the surface of the semi-finished spectacle lens having the embossed code to at least partly cover the embossed code;

uniquely identifying the semi-finished spectacle lens by the unique code, wherein the unique code is a machine-readable code;

producing the semi-finished spectacle lens by casting or injection molding;

applying the sticker onto the semi-finished spectacle lens after the casting or the injection molding;

surface processing at least one of a front surface or a back surface of the semi-finished spectacle lens after the sticker has been applied;

reading out the unique code of the sticker from a first side of the semi-finished spectacle lens; and reading out the embossed code from a second side of the semi-finished spectacle lens.

4. The method as claimed in claim 1, further comprising:

surface processing at least one of a front surface or a back surface of the semi-finished spectacle lens; and applying the sticker to the semi-finished spectacle lens before carrying out the surface processing of the at least one of the front surface or the back surface of the semi-finished spectacle lens.

5. A method for processing a semi-finished spectacle lens comprising:

providing a semi-finished spectacle lens having an embossed code;

applying a sticker having a unique code to the semi-finished spectacle lens to at least partly cover the embossed code;

uniquely identifying the semi-finished spectacle lens by the unique code;

reading out a code from at least one tool mold that was used to mold at least one surface of the semi-finished spectacle lens;

applying the sticker with the unique code for unique identification of the semi-finished spectacle lens to the semi-finished spectacle lens having the at least one surface molded in the at least one tool mold; and assigning a connection between the code of the tool mold and the unique code of the sticker.

6. A method for processing a semi-finished spectacle lens comprising:

providing a semi-finished spectacle lens having an embossed code;

applying a sticker having a unique code to the semi-finished spectacle lens to at least partly cover the embossed code;

uniquely identifying the semi-finished spectacle lens by the unique code; and tracking a respective semi-finished spectacle lens being manufactured in a multi-stage manufacturing process on a basis of the sticker with the unique code for unique identification of the respective semi-finished spectacle lens, the sticker having been applied on the respective semi-finished spectacle lens.

7. A method for processing a semi-finished spectacle lens comprising:

providing a semi-finished spectacle lens having an embossed code;

applying a sticker having a unique code to the semi-finished spectacle lens to at least partly cover the embossed code;

uniquely identifying the semi-finished spectacle lens by the unique code;

reading out the unique code for unique identification of the semi-finished spectacle lens;

interrogating at least one correction parameter for a subsequent processing step on a basis of the unique code; and applying the correction parameter in the subsequent processing step.

8. The method as claimed in claim 1, further comprising:

providing the semi-finished spectacle lens with an additional embossed code, and applying the sticker to the semi-finished spectacle lens such that the sticker at least partly leaves free the additional embossed code.

9. The method as claimed in claim 1, further comprising:

reading out the unique code of the sticker from a first side of the semi-finished spectacle lens; and reading out the embossed code from a second side of the semi-finished spectacle lens.

10. A method for processing a semi-finished spectacle lens comprising:

providing a semi-finished spectacle lens having an embossed code;

applying a sticker having a unique code to the semi-finished spectacle lens to at least partly cover the embossed code; and uniquely identifying the semi-finished spectacle lens by the unique code, wherein the sticker is applied on the semi-finished spectacle lens with a positioning accuracy from the group of ±1 mm, ±500 µm, ±200 µm, ±100 µm, ±50 µm, and ±20 µm relative to a center of the semi-finished spectacle lens, and an angular accuracy from the group of ±1° and ±0.5° relative to a center of the semi-finished spectacle lens.

11. A method of identifying a semi-finished spectacle lens in manufacturing, the method comprising:

providing a semi-finished spectacle lens having an embossed code on one of an object side surface or an eye-side surface of the semi-finished spectacle lens;

providing a detachable sticker having a unique code for a unique identification of the semi-finished spectacle lens to one of the object side surface or the eye-side surface of the semi-finished spectacle lens;

applying the detachable sticker on the semi-finished spectacle lens such that the detachable sticker at least partly covers the embossed code;

performing at least one manufacturing step on the semi-finished spectacle lens while having the detachable sticker attached to the semi-finished spectacle lens; and removing the detachable sticker from the spectacle lens after performing one or more manufacturing steps on the spectacle lens.

\* \* \* \* \*